United States Patent
Kizer

(10) Patent No.: US 6,176,556 B1
(45) Date of Patent: Jan. 23, 2001

(54) BRAKING SYSTEM FOR ACCOMMODATION OF REGENERATIVE BRAKING IN AN ELECTRIC OR HYBRID ELECTRIC VEHICLE

(75) Inventor: Thomas L. Kizer, Farmington Hills, MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/145,604

(22) Filed: Sep. 2, 1998

(51) Int. Cl.[7] .................................................. B60T 8/64
(52) U.S. Cl. ......................... 303/152; 303/3; 303/114.3
(58) Field of Search .......................... 303/3, 15, 152, 303/115.1, 115.2, 115.3, 114.3, 113.3, 4, 20, 114.1; 188/156, 356

(56) References Cited

U.S. PATENT DOCUMENTS

| | | | |
|---|---|---|---|
| 4,057,301 | * 11/1977 | Foster | 303/114.3 |
| 4,181,366 | * 1/1980 | Dobner | 303/3 |
| 4,550,372 | * 10/1985 | Kahrs | 303/3 |
| 4,828,332 | * 5/1989 | Lohberg | 303/113.3 |
| 5,350,224 | * 9/1994 | Nell et al. | 188/356 |
| 5,421,643 | * 6/1995 | Kircher et al. | 303/3 |
| 5,484,193 | * 1/1996 | Fuller et al. | 188/356 |
| 5,551,764 | * 9/1996 | Kircher et al. | 303/3 |
| 5,578,911 | 11/1996 | Carter et al. | |
| 5,713,638 | * 2/1998 | Shimamura et al. | 303/3 |
| 5,762,407 | * 6/1998 | Stacey et al. | 303/3 |

* cited by examiner

Primary Examiner—Robert J. Oberleitner
Assistant Examiner—Thomas J. Williams
(74) Attorney, Agent, or Firm—Roland A. Fuller, III

(57) ABSTRACT

A pedal modifier regenerative braking system is provided for an electric or hybrid electric vehicle having regenerative braking system. The pedal modifier regenerative braking system provides a mechanism for superimposing on a traditional vacuum power hydraulic system a reduction in the energy introduced by the vehicle driver into the friction brake system by an amount that is a function of the vehicle braking provided by an electric motor in a regeneration mode.

2 Claims, 3 Drawing Sheets

BRAKING SYSTEM FOR ACCOMMODATION OF REGENERATIVE BRAKING IN AN ELECTRIC OR HYBRID ELECTRIC VEHICLE

FIELD OF THE INVENTION

The present invention relates generally to an electric or hybrid electric vehicle and, more particularly, to a braking system for accommodation of regenerative braking in an electric or hybrid electric vehicle.

BACKGROUND AND SUMMARY OF THE INVENTION

Since the invention of power vehicles, many different powertrain systems have been attempted, including a steam engine with a boiler or an electric motor with a storage battery. It was, however, the discovery of petroleum in 1856 in the four-stroke internal combustion engine invented by Otto in 1876 that provided the impetus for the modern motor vehicle industry.

Although fossil fuel emerged as the fuel of choice for motor vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity, or a combination of these fuels.

A dedicated electric powered vehicle offers several advantages: electricity is readily available, an electric powered distribution system is already in place, and an electric powered vehicle produces no emission. There are, however, several technological disadvantages that must be overcome before electric powered vehicles gain acceptance in the marketplace.

Hybrid powered vehicles, powered by both an internal combustion engine and an electric motor, have been widely proposed for overcoming the technical disadvantages of a dedicated electric vehicle while still offering an increased efficiency. The performance and range characteristics of a hybrid powered vehicle is comparable to a conventional fossil fuel powered vehicle. However, a great deal of development is still necessary in order to provide a hybrid electric vehicle which would be widely accepted by the consuming public.

One of the key contributors of electric and hybrid electric vehicle powertrains to the achievement of adequate driving range and fuel efficiency is the ability to regenerate braking energy for later use in propelling the vehicle rather than to reject it in the form of heat. Achieving repeatable and consistent braking performance in a vehicle with two mechanisms of braking, i.e., friction brakes and electric motor regeneration braking, and where the effect of the electric motor regenerative braking is necessarily variable and inadequate to do the total job, it is necessary to make the friction brake mechanism controllably variable so that the sum of the two braking mechanisms working together provides a level of braking performance consistent with the expectations of the driver. Traditional friction brake systems do not provide the desired controllable variability.

Recently developed regenerative braking systems often achieve the desired friction brake controllable variability by isolating the driver's brake pedal and foot from the function of the friction brakes by first simulating the traditional feel of the brakes at the pedal and second, providing the desired controllably variable friction braking by means of either computer controlled electrically actuated or servo-hydraulically actuated friction brakes.

The present invention takes a different approach in that it provides a means of superimposing on a traditional vacuum power hydraulic brake system a means of controllably reducing the energy introduced by the vehicle driver into the friction brake system by an amount that is a function of the vehicle braking provided by the electric motor in a regeneration mode.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
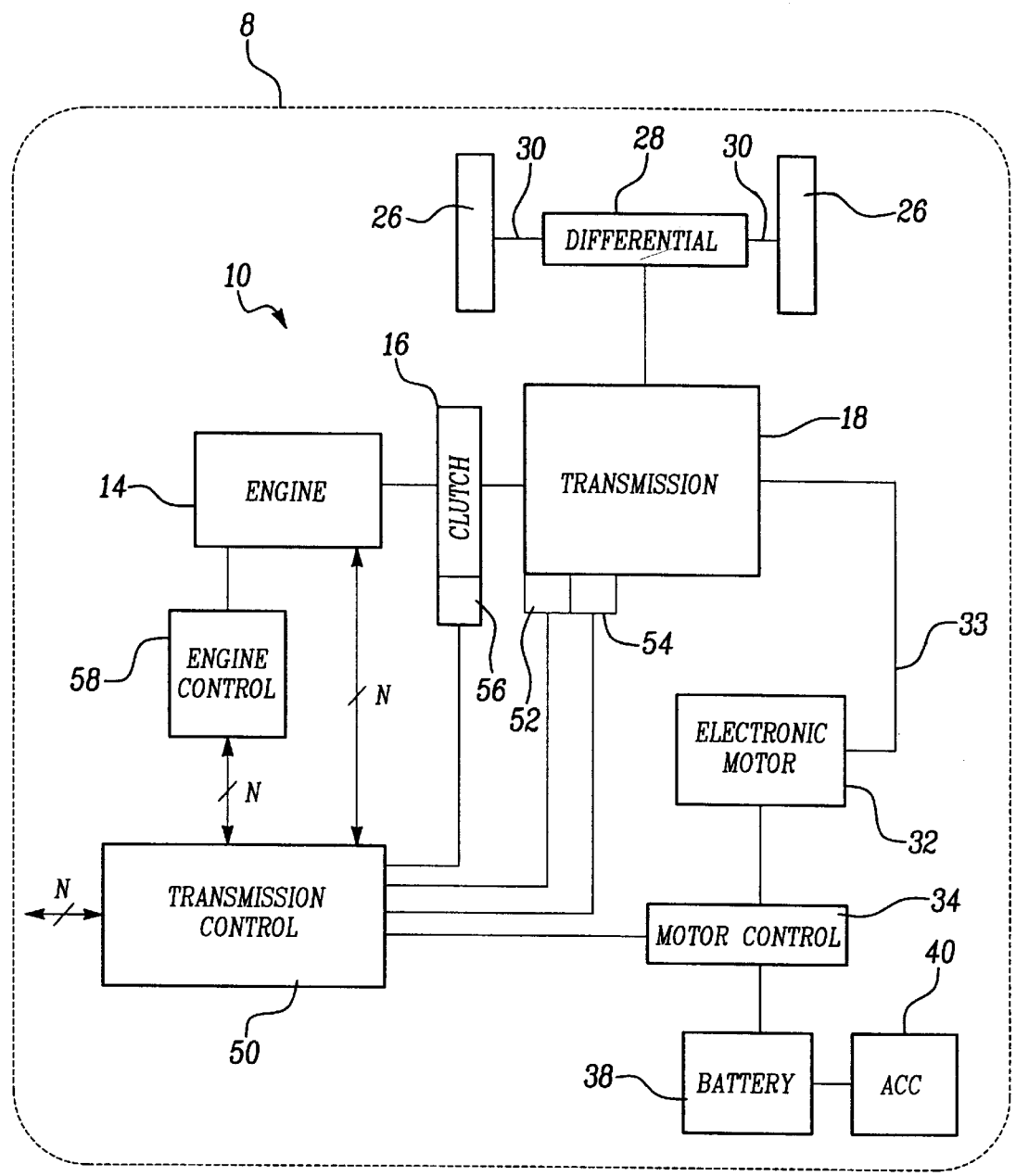
FIG. 1 is a schematic illustration of an exemplary hybrid electric powertrain having a regenerative braking-system.

Referring to FIG. 1, a hybrid powertrain system 10 according to the present invention is illustrated for a motor vehicle, generally shown at 8. The hybrid powertrain system 10 includes a heat engine 14 operating on a hydrocarbon based or fossil fuel. Preferably, the engine 14 is sized comparable to an engine for a non-hybrid motor vehicle.

The hybrid powertrain system 10 also includes a clutch mechanism 16, as is known in the art, for operably interconnecting engine 14 and transmission 18. The clutch mechanism 16 compensates for the difference in rotational speed of engine 14 and transmission 18, to provide smooth engagement between engine 14 and transmission 18.

Transmission 18 connects to engine 14 through clutch 16 and transmits engine rotation and power at various ratios to a pair of drive wheels 26 of the motor vehicle. Thus, transmission 18 enables the motor vehicle 8 to accelerate through predetermined gear ratios, while engine 14 functions within a predetermined operating range. Examples of known transmission types include an automatic transmission, a manual transmission, and continuously variable transmission. It should be appreciated that a preferred embodiment, transmission 18, is a four- or five-speed manual transmission, as is well known in the art.

Transmission 18 drives a differential unit 28. Differential unit 28 engages a pair of axle shafts 30 which are operably connected to the pair of wheels 26.

The hybrid powertrain system 10 also includes an electric motor 32 operably connected to transmission 18 at the opposite end of an input shaft from clutch 16. Electric motor 32 is connected to the input shaft opposite from clutch 16 by a gear train 33. The electric motor 32 is capable of providing both positive and regenerative torque by functioning as a motor and a generator, respectively. An example of an electric motor 32 is an induction motor or a permanent magnet motor, such as manufactured by Delphi Electronics Corporation.

As a generator, electric motor 32 produces a regenerative torque, preferably as an alternating current (A/C), which is transferred to a control mechanism, such as a motor controller 34. Motor controller 34 changes the alternating current into a direct current (D/C), as is well known in the art. The direct current may then be transmitted to an energy storage apparatus 38, such as a battery. Alternatively, as a motor, the electric motor 32 produces a positive torque that is applied to the input shaft of the transmission 18 and is ultimately used to drive wheels 26.

Motor vehicle 8 is provided with a regenerative braking system, capable of capturing kinetic energy from the momentum of the motor vehicle as it is slowing down and storing this energy as potential energy in the energy storage apparatus 38 to be described. Electric motor 32 is controlled to slow the motor vehicle down by applying a braking force that slows down the rotation of the input shaft. Electric motor 32 functions as a generator and captures the reverse energy flow. Motor vehicle 8 is also provided with a friction brake system as shown in FIG. 2, and which will be described in greater detail herein.

The hybrid powertrain system 10 also includes a transmission controller 50, such as an electronic control unit. Transmission controller 50 enables electronic control of transmission 18 to enable the transmission 18 to be configured as a manual-styled transmission, but to be operated from a driver's standpoint as an automatic transmission. To effect such operation, transmission 18 has a pair of actuators 52 and 54 which simulate positioning of the stick shift actuators as in a conventional manual transmission. Further, actuator 56 enables operating of clutch 16 in replacement of a clutch pedal as on a conventional manual transmission. In order to generate such control signals, transmission controller 50 receives input signals from engine 14 or an engine controller 58. Examples of such information received from engine 14 or engine controller 58 include vehicle speed, rpm, or the like. Similarly, transmission controller 50 generates output signals to control actuators 52, 54 and 56 and also outputs diagnostic and other communication signals to engine 14 and/or engine controller 58. Transmission controller 50 may also receive other vehicle condition signals depending on a particular configuration of the transmission 18. It should be noted that the above description of a hybrid electric powertain system is merely exemplary and that the pedal modifier regenerative braking system according to the present invention is not intended to be limited by the exemplary hybrid powertrain system. In particular, the pedal modifier regenerative braking system disclosed herein may also be used with a dedicated electric vehicle or other hybrid electric powertrain configurations as will be understood by one having ordinary skill in the art.

Figure 2:
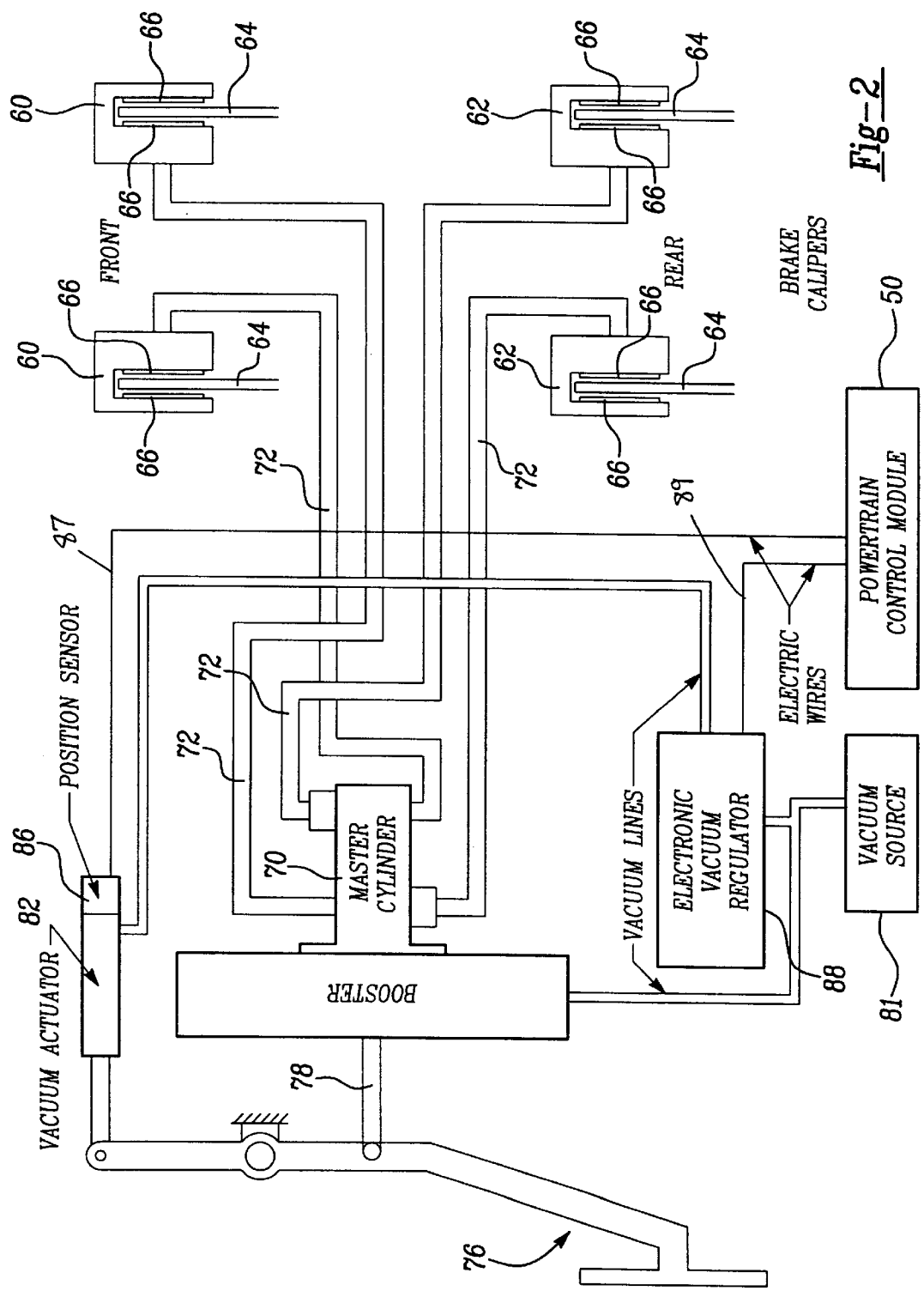
FIG. 2 is a schematic illustration of a pedal modifier regenerative braking system according to the principles of the present invention.

The pedal modifier regenerative braking system according to a first embodiment of the present invention is shown in FIG. 2. The braking system includes a pair of front and rear brake calipers 60, 62, respectively. The brake calipers 60, 62 fit around a brake disc 64 and houses the brake pads 66. The brake calipers also house hydraulic cylinders which are communicated with a master cylinder 70. Hydraulic pressure from the master cylinder 70 forces the pistons in the hydraulic cylinders to push the brake pads 66 against the disc 64. The disc plates 64 are fixed to the wheels of the vehicle.

A brake pedal 76 is pivotally mounted within the vehicle. The brake pedal is attached to a piston 78 which is moved within the master cylinder 70, raising the pressure of the brake fluid evenly through the system. The increased pressure due to actuation of the brake pedal 76 makes pistons in the wheel cylinders move with great force, applying the brake pads 66 against the discs 64. The friction that this creates then slows the car down. A booster 80, as is known in the art, is provided which receives a vacuum pressure from a vacuum source 81, such as a pump or an intake manifold, to assist in pressurizing the master cylinder 70.

The pedal modifier regenerative braking system of the present invention includes an air cylinder or diaphragm actuator 82 acting on the brake pedal 76 or alternatively on the input shaft to the master cylinder 70. The force from the driver's foot that is normally transmitted directly into the brake booster/master cylinder system 70 is reduced by taking some controllable amount of that force into the actuator 82 without a noticeable change in the driver's pedal effort or position. The magnitude of the reduction of force applied to the master cylinder system 70 is a function of the amount of friction braking reduction that is desired to exactly compensate for the increased braking effect of the electric motor in its regenerating mode.

The system is equipped with a position sensor 86 on the vacuum actuator 82 which provides a position signal via wire 87 to the powertrain control module 50 which in turn provides a signal via wire 89 to the electronic vacuum regulator 88 to apply a modifier force to the actuator 82 as a function of pedal position to react against the driver's brake pedal input force and prevent friction braking until regenerative braking is at its desired level. Under most braking conditions, it is desirable for the braking effort to be supplied by the regenerative braking system up to its maximum capability and, if higher levels of deceleration are desired, for the friction braking system to supplement the regenerative braking system. Accordingly, the position sensor 86 permits the control system to apply a brake modifier force as a function of pedal position to react against the driver's brake pedal input force and prevent friction braking until regenerative braking is at its desired level.

Figure 3:
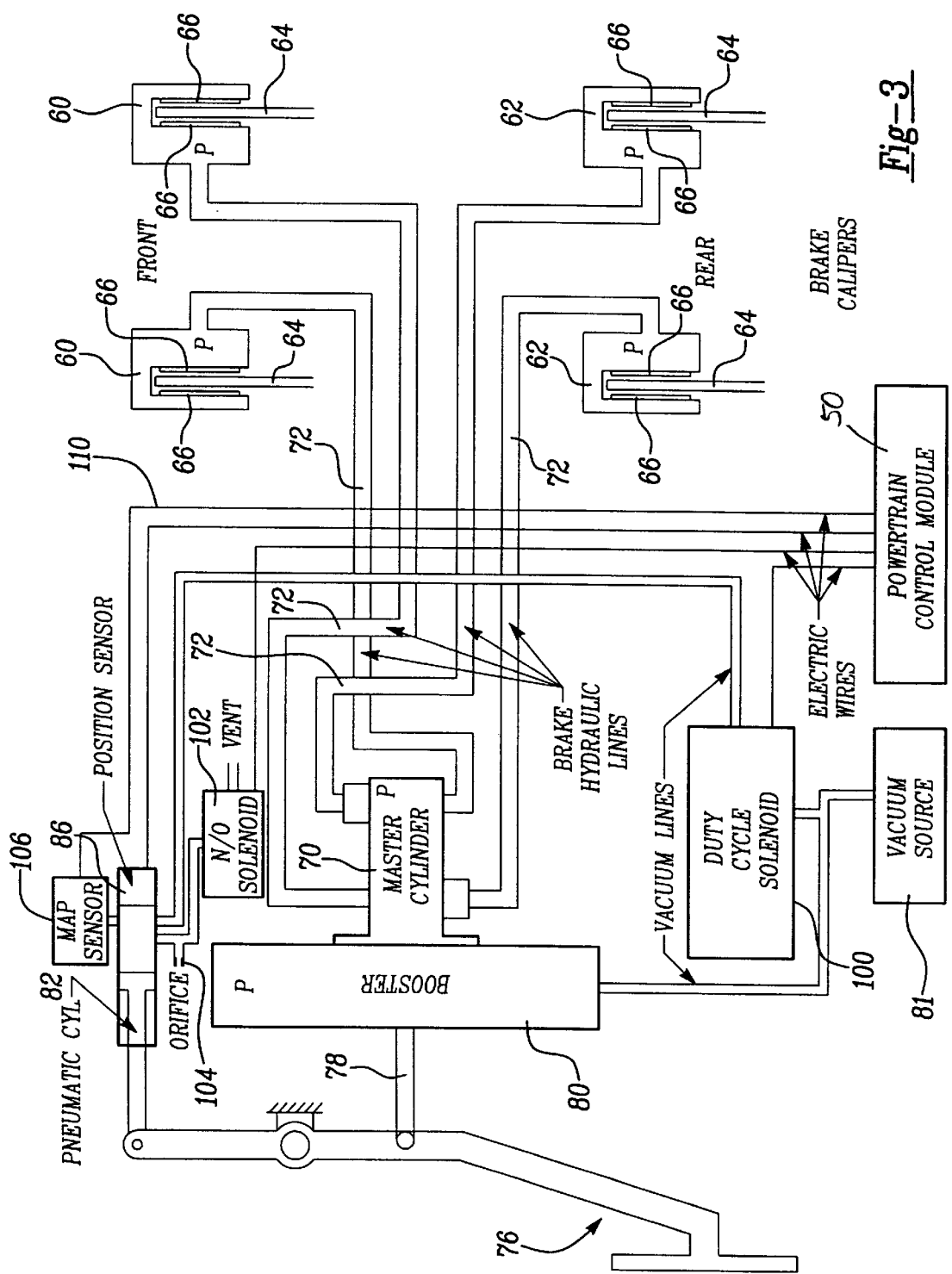
FIG. 3 is a schematic diagram of a pedal modifier regenerative braking system according to a second embodiment of the present invention.

According to a second embodiment of the present invention, as shown in FIG. 3, where like reference numerals designate common elements, the vacuum regulator has been replaced by a duty cycle solenoid 100, a normally open solenoid 102, an orifice 104, and a manifold absolute pressure sensor 106 which, in combination, perform the function of the vacuum regulator of the first embodiment. In this embodiment, the normally open solenoid 102 is connected to the actuator 82 so as to operatively release the vacuum pressure applied to the vacuum actuator 82. The orifice 104 is also connected to the vacuum actuator 82 to slowly release the vacuum pressure in the vacuum actuator. The manifold absolute pressure sensor 106 senses the pressure within the vacuum actuator 82 and provides a signal to the powertrain control module 50. The powertrain control module 50 receives the position signal from the position sensor 86 as well as the pressure signal from the manifold absolute pressure sensor 106 and provides a control signal to the duty cycle solenoid 100 indicative of the vacuum pressure required to compensate for the increased braking effect of the electric motor in its regenerating mode. Since the vacuum pressure of the vacuum source is not always constant, the manifold absolute pressure sensor 106 monitors the vacuum pressure within the vacuum actuator 82 so that the duty cycle solenoid 100 can be operated on a closed loop control so that the vacuum pressure applied to the vacuum actuator 82 is accurately controlled.

When regeneration is commanded, the normally open solenoid 102 is closed and the duty cycle solenoid 100 is modulated to provide a pneumatic cylinder vacuum of a value commensurate with the amount of brake line pressure reduction required to compensate for the electric motor regeneration torque to the wheels. The manifold absolute pressure sensor 106 provides feedback to the controller 50 via wire 110 to permit accurate adjustment of the duty cycle solenoid 100. The orifice 104, having a much lower flow area than the duty cycle solenoid 100, provides a fixed flow area leak into the cylinder to permit bi-directional control of the pneumatic cylinder vacuum by the duty cycle solenoid 100. Upon cancellation of the regenerative braking, the normally open solenoid 102 is opened by the controller 50 to permit rapid cancellation of the force supplied by the pneumatic cylinder 82.

The primary difference between the first and second embodiments as illustrated in FIGS. 2 and 3 is that the function of the duty cycle solenoid 100 normally open solenoid 102, manifold absolute pressure sensor 106, and orifice 104 of the second embodiment (FIG. 3) is combined in the electronic vacuum regulator 88 of the first embodiment (FIG. 2). The function of the two embodiments is identical. The manifold absolute pressure sensor 106, normally open solenoid 102 and duty cycle solenoid 100 are each electrically connected to the powertrain control module 50 to give and receive signals therefrom.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pedal modifier regenerative braking system for a vehicle, comprising:
   a brake pedal for actuation by a vehicle operator;
   a regeneration braking system capable of converting braking energy to electric energy;
   a powertrain control module for controlling said regeneration braking system;
   a friction brake system including a master cylinder provided with a piston member driven by said brake pedal, said master cylinder communicating with a plurality of hydraulic brake lines which communicate with a plurality of friction brake mechanisms;
   an actuator drivingly connected to said brake pedal for applying a reaction force to the brake pedal for reducing the force applied to the master cylinder when said brake pedal is operated, said reduction in force corresponding to an amount of regeneration braking provided by said regeneration braking system;
   a position sensor for detecting a position of said brake pedal and providing a position signal to said powertrain control module; and
   an electronic vacuum regulator for controllably applying a vacuum pressure to said actuator corresponding to the desired amount of reduction in force applied to the master cylinder.

2. A pedal modifier regenerative braking system for a vehicle, comprising:
   a brake pedal for actuation by a vehicle operator;
   a regeneration braking system capable of converting braking energy to electric energy;
   a control module for controlling said regeneration braking system;
   a friction brake system including a master cylinder provided with a piston member driven by said brake pedal, said master cylinder communicating with a plurality of hydraulic brake lines which communicate with a plurality of friction brake mechanisms;
   an actuator drivingly connected to said brake pedal for applying a reaction force to the brake pedal for reducing the force applied to the master cylinder when said brake pedal is operated, said reduction in force corresponding to an amount of regeneration braking provided by said regeneration braking system;
   a position sensor for detecting a position of said brake pedal and providing a position signal to said control module;
   a duty cycle solenoid for controllably applying a vacuum pressure to said actuator corresponding to the desired amount of reduction in force applied to the master cylinder;
   a pressure sensor for sensing the vacuum pressure applied to the actuator and providing a signal to said control module; and
   a solenoid connected to said actuator for controllably venting the actuator when regenerative braking is no longer utilized.

* * * * *